United States Patent Office 3,677,966
Patented July 18, 1972

3,677,966
TEMPERATURE INDICATING DISPERSION FILTER
Jan Bol, Kelkheim, Taunus, Hildegard Buttner, Oberursel, Taunus, and Peter Kuhn, Ruppertshain, Taunus, Germany, assignors to The Battelle Development Corporation, Columbus, Ohio
No Drawing. Filed Nov. 16, 1970, Ser. No. 90,150
Int. Cl. G01k 11/16, 11/18
U.S. Cl. 252—408
1 Claim

ABSTRACT OF THE DISCLOSURE

A dispersion filter made primarily of glass with the addition of a solid plastic material having "an index of refraction ($n_D$) at 20° C. of about 1.560 to 1.568, a dispersion ($n_F - n_C$) of about 0.014 to 0.016 and a temperature coefficient ($dn/dT$) of the index of refraction of about $1 \times 10^{-4}$ to $4 \times 10^{-4}$ per degree C."

---

The invention relates to a temperature indicator on the basis of a dispersion filter of solid component, wherein one solid component is mixed with glass granules as a further solid component, particularly for visually indicating the temperature in the region of 0° C.

Known temperature indicating appliances, based on the changing of optical properties with temperature, show that a given temperature has been reached either by a change in colour or also by a change in their translucent character.

British specification 1,134,027 and Austrian specification 271,275 describe a temperature indicator wherein various temperatures in one range can be recognised by associating them with various colours of the spectrum. However, this indicator consists of a solid and a liquid phase, which leads to certain disadvantages in handling. On the one hand the mixture of solid and liquid phase has to be filled into a bulb during manufacture in order to form the optical filter. On the other hand precautions have to be taken to protect the filter from excessive impact or shock as these might break it.

The problem underlying the invention is to provide a temperature indicator of the above type consisting of solid component, wherein various temperatures in one range can likewise be recognised by association with various colours of the spectrum.

The problem is solved, according to the invention, in that the glass granules have an index of refraction $n_D$ of about 1.568 to 1.576 and a dispersion $n_F - n_C$ of about 0.009 to 0.015, and that a plastics material with an index of refraction $n_D$ at 20° C. of about 1.560 to 1.568, a dispersion $n_F - n_C$ of about 0.014 to 0.016 and a temperature coefficient $dn/dT$ of the index of refraction of about $1 \times 10^{-4}$ to $4 \times 10^{-4}$ per degree C. is provided as the additional solid component.

The temperature indicator according to the invention has the special advantage that it is largely insensitive to impact and shock, that a bulb, i.e. a special vessel, can be dispensed with during its manufacture and, last but not least, that it successively shows the colours of the spectrum from red through orange, yellow, yellowish-green to green in the temperature range from about —5 to +12° C.

With regard to manufacture, the mixture of glass granules and liquid plastics material is, for example, cast into a mould in which it can cure. Once it has cured and been demoulded the temperature indicator is finished. Alternatively, a preform made of glass granules may be impregnated with the plastics material while liquid prior to curing.

As the human eye can distinguish numerous individual colours in the given spectral range, temperature can be determined to an accuracy of at least 1° C. with the temperature indicator according to the invention.

As an extension of the basic idea of the invention, the plastics material may be formed by mixing a plurality of components in the fluid state. By varying the mixing ratio the colour scale may be displaced within certain limits relative to the temperature scale.

Compositions and properties of dispersion filters (also known as Christiansen filters) suitable for use as temperature indicators are listed below by way of example.

The dispersion filters consist of glass granules of 0.1 to 0.3 mm. diameter which are embedded, tightly packed, in a plastic mould 4 to 10 mm. thick.

The names used in connection with the filters for the types of glass, plastics and their components or additives are commercial names used by the firms mentioned. The types of glass, plastics and their components or additives may, however, readily be replaced by other products with the same optical properties.

The plastics used is a product of Messrs. Stromit Chemische Fabrik, Wesseling, Cologne, Germany. It is prepared starting with the prescribed mixture:

8 parts Stromit-Elastic-Glas and
3 parts hardener C/8.

In order to determine exactly the index of refraction of the resultant polymer required for combination with the glass granules, various percentages of adhesive additive P4, also produced by Messrs. Stromit, are added to the mixture.

FILTER I

Glass granules.—Barit-Flinte-Glas (Ba F2 (570 494)) produced by Messrs. Schott & Gen., Mainz, Germany Index of refraction _____ $n_D = 1.56965$.
Dispersion _____ $n_F - n_C = 0.0115$.

($n_D$, $n_F$, $n_C$ represent index of refraction with sodium-D-, hydrogen-F-, hydrogen-C-line).

Plastics.—Stromit-Elastic-Glas with hardener and 2.3% by volume adhesive additive P4.

Index of refraction at 20° C. _____ $n_D = 1.563$.
Dispersion _____ $n_F - n_C = 0.015$.
Temperature coefficient _____ $dn/dT = 4 \times 10^{-4}$ per degree C.

The plastics material used may be a copolymer comprising 75% ethoxyline resin (e.g. Epikote 828 produced by Shell International Research Maatschappij N.V., The Hague) with 25% of a low molecular weight alkyl ether polysulphide with small admixtures of diethylene triamine and/or triethylene tetramine, a trialkoxy silane with polyamide amine being used as the adhesive additive.

FILTER II

Glass granules.—Barit-Leicht-Flinte Glas (Ba LF2 (571 509)) produced by Messrs. Schott & Gen.

Index of refraction ............. $n_D = 1.57099$.
Dispersion ..................... $n_F - n_C = 0.0112$.

Plastics material.—Stromit-Elastic-Glas with hardener and 2.1% adhesive additive P4

Index of refraction at 20° C. ........ $n_D = 1.564$.
Dispersion ..................... } See Filter I.
Temperature coefficient .........}

FILTER III

Glass granules.—Leicht-Flinte-Glas (LF 1 (573 426)) produced by Messrs. Schott & Gen., Mainz, Germany.

Index of refraction ............. $n_D = 1.57319$.
Dispersion ..................... $n_F - n_C = 0.0135$.

Plastics material.—Stromit-Elastic-Glas with hardener but without adhesive additive P4

Index of refraction at 20° C. ........ $n_D = 1.565$.
Dispersion ..................... } See Filter I.
Temperature coefficient .........}

FILTER IV

Glass granules.—Barit-Krone-Glas (Ba K6 (574 564)) produced by Messrs. Schott & Gen.

Index of refraction ............. $n_D = 1.57444$.
Dispersion ..................... $n_F - n_C = 0.0102$.

Plastics material.—Stromit-Elastic-Glas with hardener but without adhesive additive P4.
Index of refraction at 20° C. ........... $n_D = 1.565$.
Dispersion ..................... } See Filter I.
Temperature coefficient .........}

The colours which are let through unaffected by these filters in dependence on temperature are shown in the following table:

| Temperature, °C. | Filter I, Ba F2 | Filter II, Ba LF2 | Filter III, LF 1 | Filter IV, Ba K6 |
|---|---|---|---|---|
| −5 | Red | Red | | Orange. |
| −4 | Red | Red | | Do. |
| −3 | Red | Red | Red | Do. |
| −2 | Red | Red | Red | Yellow. |
| −1 | Orange | Orange | Red | Do. |
| 0 | do | do | Red | Do. |
| +1 | do | do | Orange | Do. |
| +2 | do | do | do | Do. |
| +3 | Yellow | Yellow | Yellow | Do. |
| +4 | do | do | do | Do. |
| +5 | do | do | do | Green. |
| +6 | do | do | Green | Do. |
| +7 | do | do | do | Do. |
| +8 | Green | Green | do | Do. |
| +9 | do | do | do | Do. |
| +10 | do | do | Blue | Do. |
| +11 | do | do | do | Do. |
| +12 | do | do | Violet | Blue. |

The colour scales can be shifted by changing the mixing ratio between Elastic-Glas and hardener C/8 and by adding the adhesive P4.

As stated in the introductory portion of the specification the filters can be made by mixing a plurality of components in the fluid state which, obviously would include the liquid state.

The described temperature indicator can be used particularly in connection with the Ice Warning System described in the British specification 1,134,026.

We claim:
1. A temperature indicating device using a dispersion filter made of solid components, said filter comprising a cured mixture of glass granules and synthetic organic plastic, wherein said glass granules have an index of refraction ($n_D$) of about 1.568 to 1.576 and a dispersion ($n_F - n_C$) of about 0.009 to 0.015 and said plastic has an index of refraction ($n_D$) at 20° C. of about 1.560 to 1.568, a dispersion ($n_F - n_C$) of about 0.014 to 0.016 and a temperature coefficient ($dn/dT$) of about $1 \times 10^{-4}$ to $4 \times 10^{-4}$ per degree C.

References Cited

UNITED STATES PATENTS 3,577,352   5/1971   Bol ............... 252—408

ROBERT F. BURNETT, Primary Examiner

M. E. McCAMISH, Assistant Examiner

U.S. Cl. X.R.

23—230 R; 73—356; 161—408, 410; 350—160 R